UNITED STATES PATENT OFFICE.

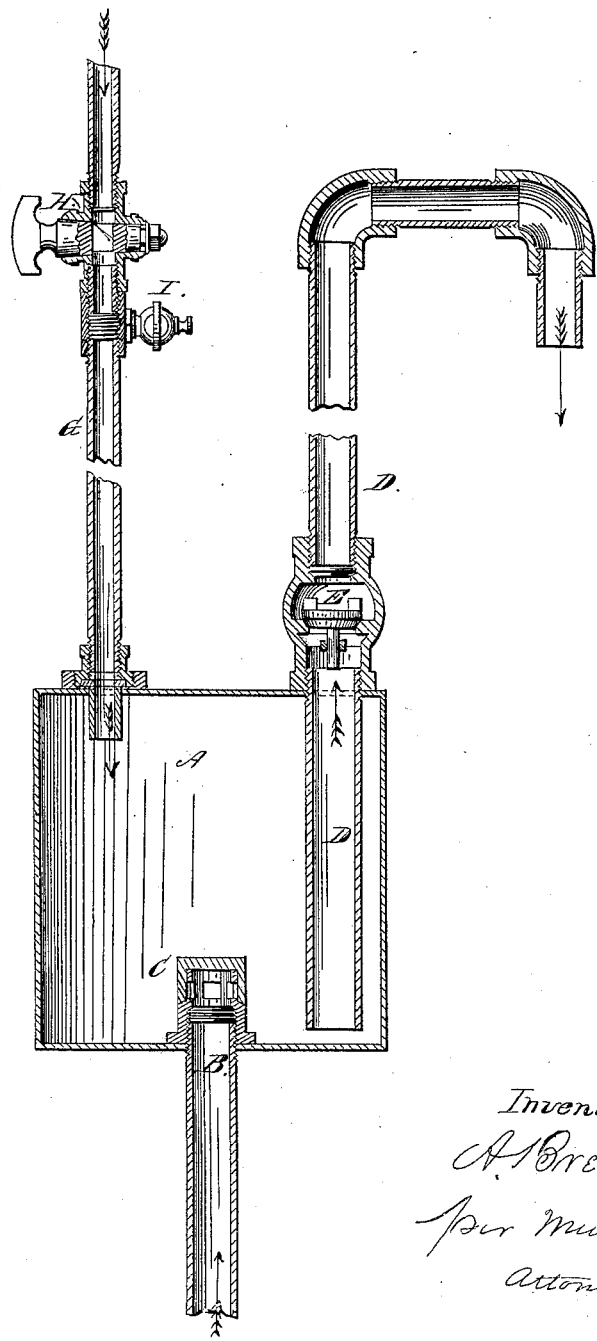

ABEL BREAR, OF SAUGATUCK, CONNECTICUT.

IMPROVED APPARATUS FOR RAISING AND FORCING WATER.

Specification forming part of Letters Patent No. 36,939, dated November 18, 1862.

*To all whom it may concern:*

Be it known that I, ABEL BREAR, of Saugatuck, in the county of Fairfield and State of Connecticut, have invented a new and Improved Apparatus for Raising and Forcing Water and other Liquids; and I do hereby declare that the following is a full, clear, and exact description of the same, reference being had to the accompanying drawing, forming a part of this specification, said drawing representing a central vertical section of the apparatus.

This invention consists in a novel apparatus for raising and forcing water or other liquid by the pressure of steam, compressed air, or gas upon its surface in a suitable vessel, into which it runs by gravitation, and is forced by the pressure of the atmosphere, after a vacuum has been produced, by the condensation of steam.

To enable others skilled in the art to make and use my invention, I will proceed to describe its construction and operation.

A is a vessel of cylindrical or other form, and of any suitable or convenient capacity. B is an inlet-pipe for liquid, attached to the bottom of the said vessel, and fitted at its junction with the vessel with a check-valve, C, which closes downward and outward. D is an outlet-pipe for liquid, secured in the top of the vessel, but extending downward nearly to the bottom thereof, and upward to where the liquid is to be delivered, fitted with a check-valve, E, closing downward and inward. G is a pipe for admitting steam, compressed air or gas into the vessel, for the expulsion of the liquid connected with the top of the vessel, and furnished with a cock or stop-valve, H, by which to admit and shut off the steam, air, or gas.

This apparatus, when employed to raise cold water from a well or other place by the pressure of steam, may have the vessel A wholly or partly submerged in the water, or may be arranged with the said vessel at a height not greater than about twenty feet above the water, and with the pipe B dipping in the water.

To set the apparatus in operation, supposing the vessel to be above the surface of the water, the cock H is opened by an attendant to admit steam from a boiler, and the pressure of the steam so admitted closes the check-valve C and opens E, and after the steam has expelled all the air from the vessel through the pipe D and filled the vessel the cock H is to be closed and the steam allowed to condense and form a vacuum in the vessel, by which means the valve E will be caused to close and C to open, and the vessel will fill with water. When the vessel has had sufficient time to fill, which will soon be ascertained by a few experiments, the cock H is opened again and steam admitted to the vessel above the water, and the pressure of the steam is then caused to close the valve C and open the valve E, and force the water from the vessel through the pipe D. When the water has all been expelled, the cock H is to be closed and condensation again takes place and the operation is repeated. In case of the vessel A being submerged in the water, the pressure of the column of water outside will aid in filling the vessel, and the condensation of steam in the vessel to form the vaccum will be much quicker; but the water may be raised to a given height with a less pressure of steam if the vessel be placed above the water. If compressed air or gas be used instead of steam, or if steam be used and the liquid to be raised be hot, so that there is no means of producing condensation, the vessel A must be submerged, and an escape-cock, I, or some other convenience will be necessary to permit the escape of the air, gas, or steam while the vessel is filling with the liquid. This may be accomplished by making the cock H with three ways.

I am aware of the use of what is termed a "monte-jus," and therefore do not claim that apparatus, which differs from my improved apparatus in having its several cocks or valves all worked by hand; but

What I claim as my invention, and desire to secure by Letters Patent, is—

The apparatus composed of the vessel A, pipe or opening B, pipes G D, cock H, or its equivalent, and the two self-acting check-valves C E, the whole combined to operate substantially as herein specified.

ABEL BREAR.

Witnesses:
M. M. LIVINGSTON,
PETER COOKE.